(12) United States Patent
Futami

(10) Patent No.: US 6,578,997 B2
(45) Date of Patent: Jun. 17, 2003

(54) MULTI-OCULAR LIGHT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 21 days.

(21) Appl. No.: 09/759,976

(22) Filed: Jan. 12, 2001

(65) Prior Publication Data

US 2001/0008486 A1 Jul. 19, 2001

(30) Foreign Application Priority Data

Jan. 14, 2000 (JP) ......................................... 2000-006817

(51) Int. Cl.⁷ ................................................. F21V 5/00
(52) U.S. Cl. ....................... 362/522; 362/512; 362/539; 362/543; 362/245; 362/332
(58) Field of Search ................................. 362/512, 513, 362/521, 543, 539, 245, 328, 332, 522

(56) References Cited

U.S. PATENT DOCUMENTS 6,109,772 A    8/2000   Futami et al. ............... 362/517
6,152,589 A   11/2000   Kawaguchi et al. ......... 362/518
6,193,400 B1 *  2/2001  Schuster et al. ............. 362/521
6,244,731 B1 *  6/2001  Koiko et al. ................. 362/268

FOREIGN PATENT DOCUMENTS

JP    11 297103    10/1999

* cited by examiner

Primary Examiner—Stephen Husar
(74) Attorney, Agent, or Firm—Weingarten, Schurgin, Gagnebin & Lebovici LLP

(57) ABSTRACT

A multi-ocular light composed by using a multi-ocular lens integrating a plurality of lenses and comprising one illumination light source for said multi-ocular lens, and a reflector mirror for distributing light from this single illumination light source to said respective lenses, wherein a signal light source is provided at the back of said multi-ocular lens to correspond to at least one lens of this multi-ocular lens, in order to assure the illumination function when said illumination light source is turned on, and the signal function when said signal light source is turned on.

6 Claims, 3 Drawing Sheets

MULTI-OCULAR LIGHT

BACKGROUND OF THE INVENTION

1. Field of the Invention

The present invention concerns a vehicle light, and more in detail, vehicle light called "projector lamp" and used for the purpose of illumination such as head lamp, fog lamp, or the like, whose composition adopts a multi-ocular lens integrating a plurality of lenses.

2. Detailed Description of the Prior Art

As an example of composition of this kind of vehicle light pertaining to the prior art, the Japan Patent Publication Hei 11-297103 of the Applicant of this Application discloses a vehicle light wherein a multi-ocular lens having for instance seven lenses disposed concentrically to a single light source is disposed, a petal form reflector mirror for introducing light to respective lens composing said multi-ocular lens is disposed to the light source, and crossing light distribution or other desired light distribution by synthesizing the light distribution shape from respective lens.

However, in said conventional multi-ocular vehicle light, when a metal halide lamp or other discharge light is adopted as light source, the light radiated downward is colored due to deposits in the bulb; therefore, said part of light radiated downward should be shielded, as for head lamp whose illumination light is prescribed as white or light yellow monochrome. Consequently, light is hardly distributed to the lens disposed below the light source, and lenses disposed downward contribute substantially little to the formation of the light distribution characteristics, causing problems. Besides, the adoption of multi-ocular lens results in an extremely strange exterior shape as vehicle light, and when it is combined with a vehicle light of conventional composition, it becomes difficult to unify the design.

SUMMARY OF THE INVENTION

As a concrete means to resolve said problems of said conventional multi-ocular light, the present invention provides a multi-ocular light composed by using a multi-ocular lens integrating a plurality of lenses and comprising one illumination light source for said multi-ocular lens, and a reflector mirror for distributing light from this single illumination light source to said respective lenses, wherein a signal light source is provided at the back of said multi-ocular lens to correspond to at least one lens of this multi-ocular lens, in order to assure the illumination function when said illumination light source is turned on, and the signal function when said signal light source is turned on; said multi-ocular light, wherein a movable shutter for opening/closing light distributed by at least one lens among said multi-ocular lens, is disposed between said illumination light and said reflector mirror, the driving light distribution is set to the light radiated outside from said lens opened/closed by said movable shutter, the crossing light distribution is set to the light radiated outside from the other lens, and the driving light distribution and the crossing light distribution is changed over by the operation of said movable shutter; and said multi-ocular light, wherein a second reflector mirror corresponding to the same lens as the second illumination light source to correspond to at least one lens of this multi-ocular lens is disposed at the back of said multi-ocular lens, the crossing light distribution is set to the light radiated outside from said lens corresponding to said illumination light, the light distribution other than crossing light distribution is set to the light radiated outside from the lens corresponding to said second illumination light, and the light distribution other than crossing light distribution is obtained when said illumination light source and second illumination light are turned on, or only said second illumination light is turned on.

BRIEF DESCRIPTION OF THE DRAWINGS

These and other objects and advantages of the present invention will become clear from the following description with reference to the accompanying drawings.

DETAILED DESCRIPTION OF THE PREFERRED EMBODIMENT

Figure 1:
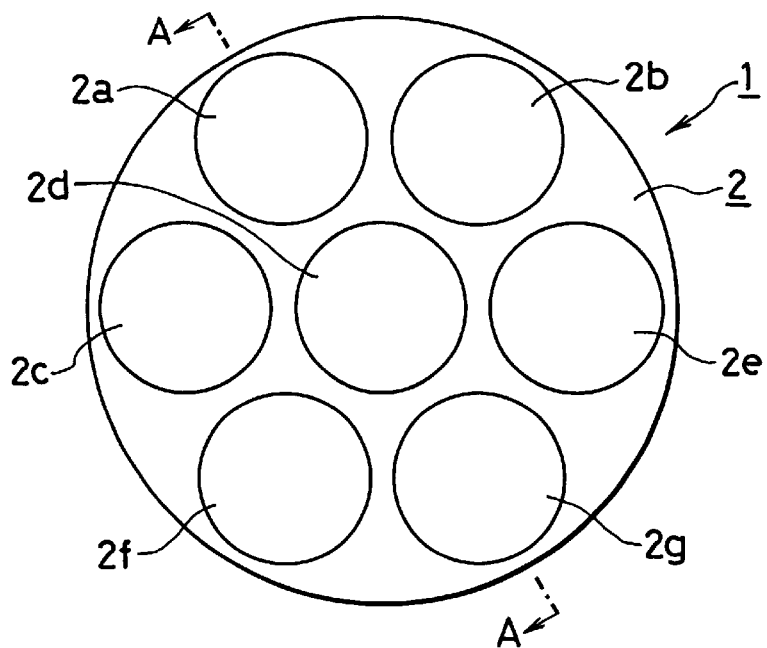
FIG. 1 is a front view showing a first embodiment of the multi-ocular light of the present invention.
Figure 2:
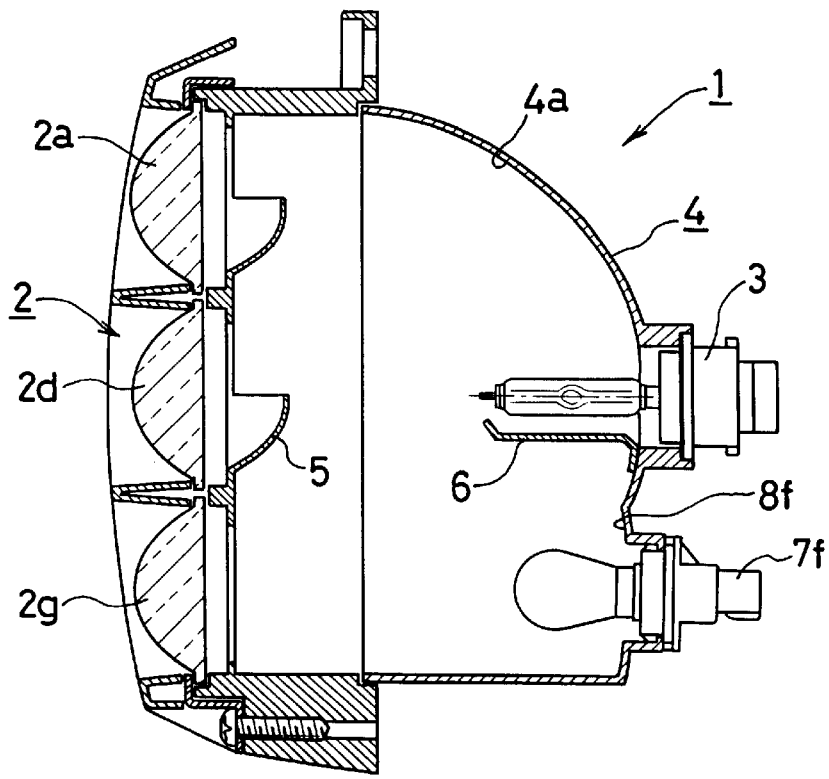
FIG. 2 is a cross-section along the line A—A of FIG. 1.

Next the present invention will be described in detail referring to the embodiments shown in drawings. In FIG. 1 and FIG. 2, the first embodiment of the multi-ocular light of the present invention is shown by the symbol 1, this multi-ocular light 1 uses a multi-ocular lens 2 integrating a plurality of lenses, for instance, lenses 2a to 2g (FIG. 1), and as in the conventional example, said multi-ocular lens 2 comprises a single illumination light 3 and a reflector mirror 4 of distributing the light from this illumination light 3 to said respective lenses 2a to 2g.

Figure 3:
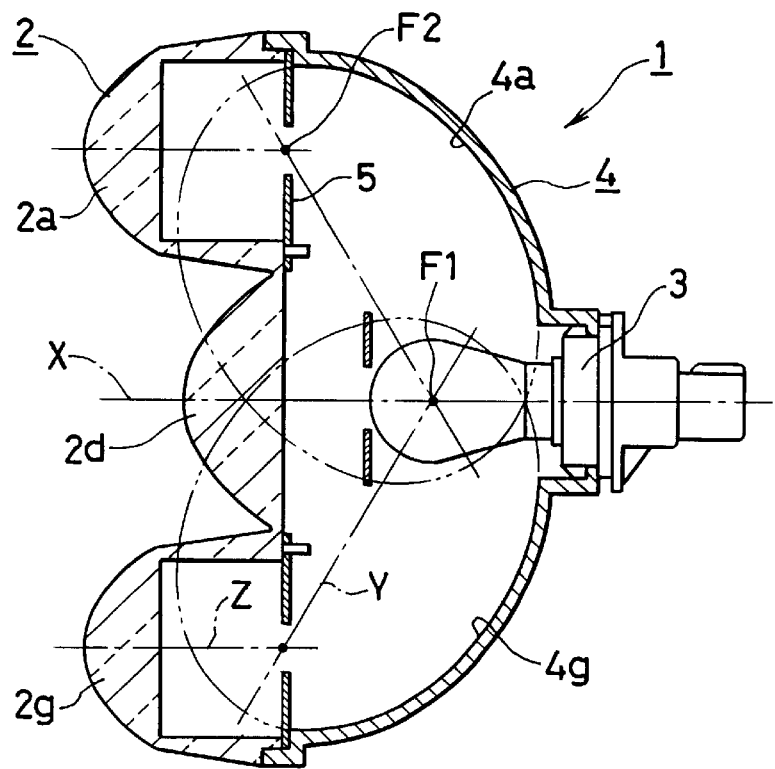
FIG. 3 illustrates the composition of the multi-ocular light.

Now, the composition of said reflector mirror 4 shall be described briefly referring to FIG. 3; this reflector mirror 4 is basically a combination of elliptical free curbed faces 4a, 4b, 4c, 4e, 4f, 4g (elliptical free curbed faces 4a and 4g are shown in the drawing) having the illumination light source 3 as the first focus F1, and including six rotational elliptical faces whose long axis Y is inclined by a convenient angle from the central axis X of said illumination light source 3; therefore, the second focus F2 is positioned on a circumference equidistant from said central axis X, and at this time, the front shape of said reflector mirror 4 forms a six-petaled flower. As the means for forming the reflector mirror with said elliptical free curbed faces is largely used for the conventional projector type lights, the detail description thereof shall be omitted herein. In addition, the description "elliptical free curbed face" shall include "rotational elliptical face".

There, the light from the illumination light 3 is distributed to lenses 2a, 2b, 2c, 2e, 2f, 2g by passing the optical axis Z set parallel to the central axis X of respective lenses 2a, 2b, 2c, 2e, 2f, 2g through the second focus of respective corresponding elliptical free curbed faces 4a, 4b, 4c, 4e, 4f, 4g. Though not shown, a reflector mirror made as a rotational elliptical face or the like separately is often disposed, for the lens 2d positioned at the center of the multi-ocular lens.

Moreover, a shield plate 5 is disposed on the respective lens 2(a to g), to the light distributed from the elliptical free curved faces 4(a, b, c, e, f, g) in this way, for shielding unnecessary part for obtaining the light distribution characteristics, and for obtaining a desired distribution characteristics by synthesizing light projected outside from the lines 2(a to g).

Here, as described above, when a metal halide lamp or other discharge light is adopted as light source 3, non evaporated metal halide deposits on the bulb lower surface, and the light passing through this non evaporated deposit is colored. Therefore, normally, this light is shielded by disposing a hood 6 under the illumination light source 3, in order to prevent the irradiation light from being colored other than in the prescribed color (refer to FIG. 2), thus reducing light amount distributed to the lens 2f, 2g.

In other words, when a discharge light is adopted as light source 3, the contribution rate of lens 2f, 2g to the light distribution characteristics as multi-ocular light 1 results in being limited. This first embodiment has been devised in consideration of said situation, and if their contribution rate to the light distribution characteristics is originally limited, it can be predicted easily that the conversion of lens 2f, 2g to the light for the other purpose will not deteriorate the function as head light so much.

Therefore, in this first embodiment, as shown in FIG. 2, a signal light source 7f is provided corresponding to said lens 2f (not shown), 2g, and at the same time, an auxiliary reflector mirror 8f is provided for respective signal light source 7f, so that the light from the signal light source 7f enters effectively in the lens 2f, lens 2g.

In such composition, for example, if the signal light source 7f, made amber, turns on intermittently, the lens 2f, 2g light up in amber according to this intermittence, and the lens 2f, 2g can be used as front turn signal lamp assuring the function of signal light.

In the foregoing, it has been described with the example of using the lens 2f, 2g exclusively as front turn signal lamp requiring relatively high brightness as signal light; however, the auxiliary reflector mirror 8f can be omitted if it is used as signal light requiring lower brightness such as position lamp. Moreover, as the light volume of signal light source 7 is also low and there is few chance of dazzling oncoming vehicles, it is free to omit the shield plate 5 of lens 2f, 2g. It is also free to use two signal light sources and to set two kinds of function such as the lens 2f as front turn, and the lens 2g as position lamp.

In such composition, at least by adding a signal light 7 (f, g), the multi-ocular light 1 assures the function of illumination light by turning on the illumination light source 3 and assures the function of signal light by tuning on the signal light source 7. When said both functions are to be assured, as the multi-ocular lens 2 is common, the cost can be reduced compared to the installation of a separate dedicated light. At the same time, as it is integrated in a multi-ocular light 1 having a particularly singular shape compared to the conventional vehicle light, design inconsistence will not occur as in a separate installation of signal light.

Figure 4:
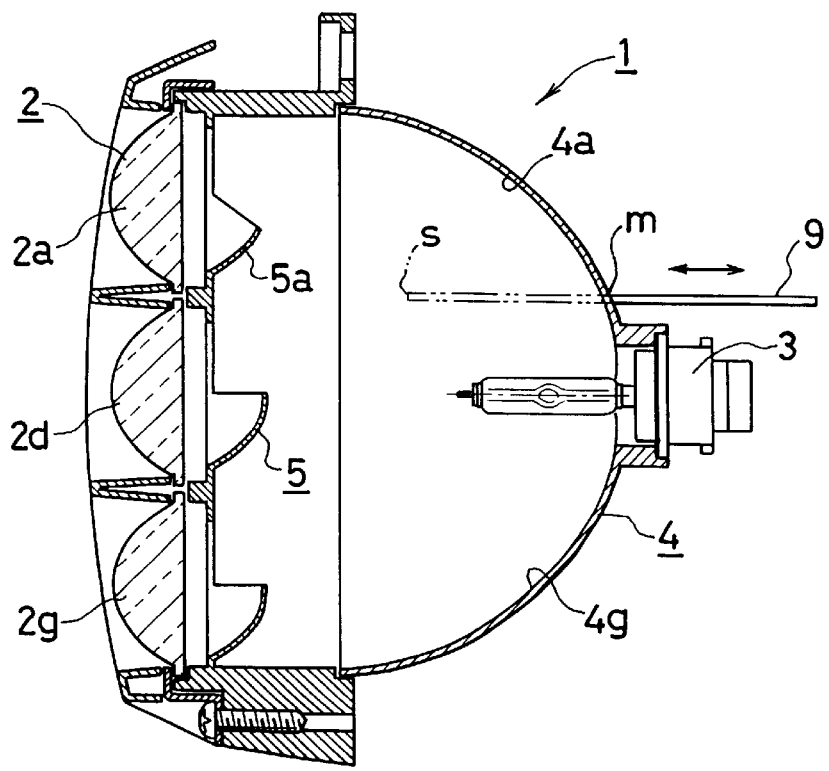
FIG. 4 is also a cross-section showing a second embodiment of the multi-ocular light of the present invention.

FIG. 4 shows a second embodiment of the present invention. Though the foregoing first embodiment is a combination of functions of illumination light and signal light by a multi-ocular light, the present invention is not limited to this and in this second embodiment, two illumination lights having different objects, driving light distribution and crossing light distribution, are combined. The front face shape of the multi-ocular light 1 is identical to the previous first embodiment, so please refer to FIG. 1 at the same time.

Here, in the second embodiment, the multi-ocular light 1 is composed of a multi-ocular lens 2, an illumination light source 2, a reflector mirror 4 and a shield plate 5 and, basically, is similar to said multi-ocular lens described for the conventional example. In addition, this invention is provided with a movable shutter 9 as shown in the drawing, and this movable shutter 9 is disposed between the illumination light source 3 and the reflector light 4 and changes over the driving light distribution and the crossing light distribution by moving the driving position m and the crossing position s.

Moreover, in this second embodiment, the driving light distribution is set to the illumination light, for example, by modifying the shape of the shield plate 5a, 5b for the lenses 2a and 2b, or, omitting the shield plate 5a, 5b or by other convenient means and the conventional crossing light distribution is set to lenses 2(c to g) other than said lenses 2a, 2b.

When said movable shutter 9 is set to the crossing position s, the light from the illumination light source 3 to the elliptical free curved faces 4a, 4b supplying said lens 2a, 2b with light is shielded, and set to the driving position m, the light from the illumination light source 3 is supplied to all elliptical free curved faces 4(a to g) including said elliptical free curved faces 4a, 4b.

Thus, when the movable shutter 9 is set to the crossing position s, only the light from lenses (2c–2g) set to the crossing light distribution is radiated outside for realizing the crossing light distribution, and when the movable shutter 9 is set to the driving position m, the driving light distribution from the lenses 2a, 2b is added to the crossing light distribution from said lenses (2c–2g), and all together, the driving light distribution can be obtained.

As an example of implementation of the second embodiment, in the foregoing, it has been described about the setting of driving light distribution to both two of lenses 2a, 2b; however, in the present invention, the position of distribution light setting and the number of lens 2 to be set are not limited and, for example, if said illumination light 3 is an incandescent lamp radiating light evenly upwards and downwards, the driving light distribution may also be set to the lens 2f, 2g.

Figure 5:
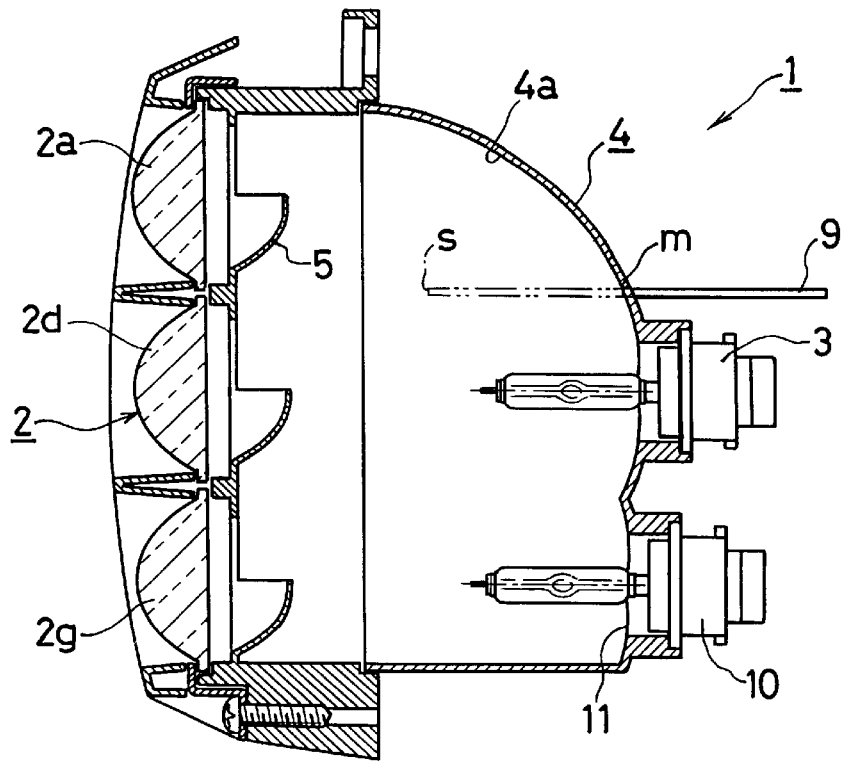
FIG. 5 is also a cross-section showing a third embodiment of the multi-ocular light of the present invention.

FIG. 5 shows a third embodiment of the present invention. This third embodiment is also an example of combination of illumination light and illumination light is an embodiment of the case requiring the possibility to blink the head light and the fog lamp separately or the like. In this third embodiment also, the front face shape is identical to the previous first and embodiments, so please refer to FIG. 1 at the same time.

In the third embodiment described herein, the head light function is afforded to the lens 2a to 2e and the fog lamp function to the lens 2f, 2g. Therefore, as for lenses 2a to 2e, their composition is similar to said second embodiment or the conventional example, so their detailed explanation shall be simplified here, and the description shall be focused mainly on the lens 2f, 2g to which the fog function is to be afforded and their peripheral parts.

First, in this third embodiment, a second light source 10 is provided corresponding to said lens 2f, 2g, separately form the illumination light source 3 corresponding to the lenses 2a to 2e, and a second reflector face 11, such as similarly elliptical curved face, is provided as reflection face corresponding to the lens 2f, 2g similarly to the aforementioned first and second embodiments.

By such composition, when the illumination light source 3 is turned on, light is radiated from the lens 2a to 2e, and when the second illumination light 10 is turned on, light is radiated from the lens 2f, 2g; therefore, by setting head lamp light distribution characteristics to said lens 2a to 2e side, and fog lamp light distribution characteristics, for instance, to the lens 2f, 2g side, respective functions can be used separately or overlapped.

The composition may be modified freely, for instance, as for said lens 2a to 2e, similarly to the second embodiment, by setting the driving light distribution to the lens 2a, 2b and the crossing light distribution to the lens 2c to 2e, and at the same time providing also a movable shutter 9, to change over the driving light distribution and the crossing light distribution, at the lens 2a–2e side having the head lamp function. Though not shown, it is also free to provide a signal light source 7 in place of second illumination light source 10.

Figure 6:
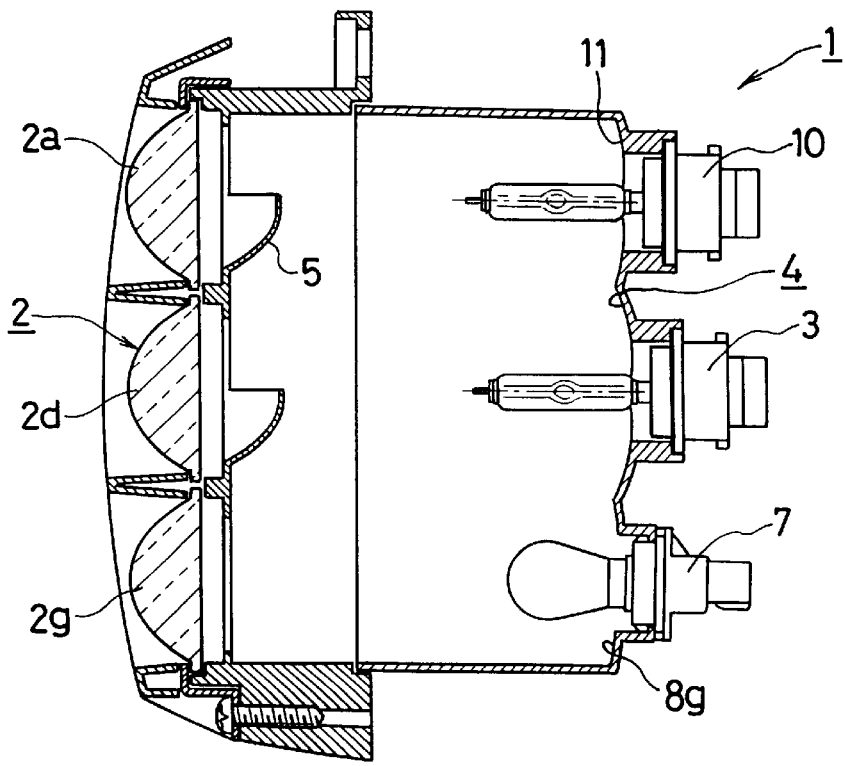
FIG. 6 is also a cross-section showing a fourth embodiment of the multi-ocular light of the present invention.

FIG. 6 is a fourth embodiment of the present invention, and this fourth embodiment is a free combination of said first embodiment to the third embodiment. And, FIG. 6 shows an example of combination of the first embodiment and the third embodiment mentioned above; in other words, in the fourth embodiment, an illumination light source 3, a second illumination light source 10 and a signal light source 7 are provided. The front face shape of this fourth embodiment is identical to the previous first to third embodiments, please refer to FIG. 1 at the same time.

According to the disposition of said three light sources 3, 7 and 10, lenses 2a to 2g also are set to correspond to their respective light source; first, a second reflector face 11 is disposed for the second illumination light source 10 corresponding to the lens 2a, 2b, elliptical free curved faces 4c to 4e are disposed to the illumination light source 3 for corresponding to the lenses 2c to 2e and the signal light source 7 corresponds to the lens 2f, 2g.

Also, in this fourth embodiment, a light distribution shape appropriate for head lamp is set for the lens 2a, 2b, a light distribution shape appropriate for fog lamp is set for the lens 2c to 2e, and a light distribution shape appropriate for turn signal lamp, or, position lamp or other signal light is set for the lens 2f, 2g. This setting allows the multi-ocular light 1 to function as illumination light when the illumination light source 3 and the second illumination light source 10 are turned on, and to function as signal light when the signal light source 7 is turned on.

As described above, by providing a multi-ocular using a multi-ocular lens integrating a plurality of lenses, wherein a signal light source is provided at the back of said multi-ocular lens to correspond to at least one lens of this multi-ocular lens, in order to assure the illumination function when said illumination light source is turned on, and the signal function when said signal light source is turned on; said multi-ocular light, wherein a movable shutter for opening/closing light distributed by at least one lens among said multi-ocular lens, is disposed between said illumination light and said reflector mirror, the driving light distribution is set to the light radiated outside from said lens opened/closed by said movable shutter, the crossing light distribution is set to the light radiated outside from the other lens; and said multi-ocular light, wherein a second reflector facer corresponding to the same lens as the second illumination light source to correspond to at least one lens of this multi-ocular lens is disposed at the back of said multi-ocular lens in a way to correspond to at least one of this multi-ocular lens, the crossing light distribution is set to the light radiated outside from said lens corresponding to said illumination light, the light distribution other than crossing light distribution is set to the light radiated outside from the lens corresponding to said second illumination light, it becomes possible to divide lenses in the multi-ocular lens into an arbitrary number and use as light for different purpose, and to reduce the cost effectively by dispensing from the necessity to install individually lights for different purposes and the light distribution other than crossing light distribution is obtained when said illumination light source and second illumination light are turned on, or only said second illumination light is turned on.

Moreover, as a plurality of functions can be integrated into a single multi-ocular lens, the design inconsistency of a combined light combining a multi-ocular light of singular shape and a light of conventional composition can be excluded, contributing to improve the esthetic appearance of the vehicle adopting this multi-ocular type light.

While the present preferred embodiment of the present invention has been shown and described, it will be understood that the present invention is not limited thereto, and that various changes and modifications may be by those skilled in the art without departing from the scope of the invention as set forth in the appended claims.

What is claimed is:

1. A multi-ocular light composed by using a multi-ocular lens integrating a plurality of lenses and comprising one illumination light source for said multi-ocular lens, and a reflector mirror for distributing light from this single illumination light source to said respective lenses, wherein a signal light source is provided at the back of said multi-ocular lens to correspond to at least one lens of this multi-ocular lens, in order to assure the illumination function when said illumination light source is turned on, and the signal function when said signal light source is turned on.

2. A multi-ocular light composed by using a multi-ocular lens integrating a plurality of lenses and comprising one illumination light source for said multi-ocular lens, and a reflector mirror for distributing light from this single illumination light source to said respective lenses, wherein a movable shutter for opening/closing light distributed by at least one lens among said multi-ocular lens, is disposed between said illumination light and said reflector mirror, the driving light distribution is set to the light radiated outside from said lens opened/closed by said movable shutter, the crossing light distribution is set to the light radiated outside from the other lens, and the driving light distribution and the crossing light distribution is changed over by the operation of said movable shutter.

3. A multi-ocular light composed by using a multi-ocular lens integrating a plurality of lenses and comprising one illumination light source for said multi-ocular lens, and a reflector mirror for distributing light from this single illumination light source to said respective lenses, wherein:

a second reflector mirror corresponding to the same lens as a second illumination light source to correspond to at least one lens of this multi-ocular lens is disposed at the back of said multi-ocular lens, the crossing light distribution is set to the light radiated outside from said lens corresponding to said illumination light, the light distribution other than crossing light distribution is set to the light radiated outside from the lens corresponding to said second illumination light, and the light distribution other than crossing light distribution is obtained when said illumination light source and second illumination light are turned on, or only said second illumination light is turned on.

4. A multi-ocular light composed by using a multi-ocular lens integrating a plurality of lenses and comprising one illumination light source for said multi-ocular lens, and a reflector mirror for distributing light from this single illumination light source to said respective lenses, wherein:

a signal light source is provided at the back of said multi-ocular lens to correspond to at least one lens of this multi-ocular lens, in order to assure the illumination function when said illumination light source is turned on, and the signal function when said signal light source is turned on; and a movable shutter for opening/closing light distributed by at least one lens among said multi-ocular lens, is disposed between said illumination light and said reflector mirror, the driving light distribution is set to the light radiated outside from said lens opened/closed by said movable shutter, the crossing light distribution is set to the light radiated outside from the other lens, and the driving light distribution and the crossing light distribution is changed over by the operation of said movable shutter.

5. A multi-ocular light composed by using a multi-ocular lens integrating a plurality of lenses and comprising one illumination light source for said multi-ocular lens, and a reflector mirror for distributing light from this single illumination light source to said respective lenses, wherein a signal light source is provided at the back of said multi-ocular lens to correspond to at least one lens of this multi-ocular lens, in order to assure the illumination function when said illumination light source is turned on, and the signal function when said signal light source is turned off; and a second reflector mirror corresponding to the same lens as a second illumination light source to correspond to at least one lens of this multi-ocular lens is disposed at the back of said multi-ocular lens, the crossing light distribution is set to the light radiated outside from said lens corresponding to said illumination light, the light distribution other than crossing light distribution is set to the light radiated outside from the lens corresponding to said second illumination light, and the light distribution other than crossing light distribution is obtained when said illumination light source and second illumination light are turned on, or only said second illumination light is turned on.

6. A multi-ocular light composed by using a multi-ocular lens integrating a plurality of lenses and comprising one illumination light source for said multi-ocular lens, and a reflector mirror for distributing light from this single illumination light source to said respective lenses, wherein a movable shutter for opening/closing light distributed by at least one lens among said multi-ocular lens, is disposed between said illumination light and said reflector mirror, the driving light distribution is set to the light radiated outside from said lens opened/closed by said movable shutter, the crossing light distribution is set to the light radiated outside from the other lens, and the driving light distribution and the crossing light distribution is changed over by the operation of said movable shutter; and a second reflector mirror corresponding to the same lens as a second illumination light source to correspond to at least one lens of this multi-ocular lens is disposed at the back of said multi-ocular lens, the crossing light distribution is set to the light radiated outside from said lens corresponding to said illumination light, the light distribution other than crossing light distribution is set to the light radiated outside from the lens corresponding to said second illumination light, and the light distribution other than crossing light distribution is obtained when said illumination light source and second illumination light are turned on, or only said second illumination light is turned on.

* * * * *

UNITED STATES PATENT AND TRADEMARK OFFICE
CERTIFICATE OF CORRECTION

PATENT NO. : 6,578,997 B2
DATED : June 17, 2003
INVENTOR(S) : Takashi Futami

It is certified that error appears in the above-identified patent and that said Letters Patent is hereby corrected as shown below:

Column 7,
Line 23, "off" should read -- on --.

Signed and Sealed this

Fourteenth Day of September, 2004

JON W. DUDAS
*Director of the United States Patent and Trademark Office*